United States Patent
Alms et al.

(10) Patent No.: US 8,132,029 B2
(45) Date of Patent: Mar. 6, 2012

(54) METHOD FOR MANAGING THE POWER TRANSMITTED FROM A CENTRAL NETWORK COMPONENT TO A DECENTRALIZED NETWORK COMPONENT VIA A LINE

(75) Inventors: Henrik Alms, Kreutzmannshagen (DE); Frank-Dieter Richter, Greifswald (DE)

(73) Assignee: Gigaset Communications GmbH, Munich (DE)

( * ) Notice: Subject to any disclaimer, the term of this patent is extended or adjusted under 35 U.S.C. 154(b) by 262 days.

(21) Appl. No.: 12/309,528

(22) PCT Filed: May 21, 2007

(86) PCT No.: PCT/EP2007/054884
§ 371 (c)(1),
(2), (4) Date: Sep. 18, 2009

(87) PCT Pub. No.: WO2008/012120
PCT Pub. Date: Jan. 31, 2008

(65) Prior Publication Data
US 2010/0031069 A1  Feb. 4, 2010

(30) Foreign Application Priority Data
Jul. 25, 2006 (DE) .......................... 10 2006 034 422

(51) Int. Cl.
*G06F 1/26* (2006.01)
(52) U.S. Cl. .......................... 713/300; 709/226; 718/104
(58) Field of Classification Search .................. 713/300; 709/226; 718/104
See application file for complete search history.

(56) References Cited

U.S. PATENT DOCUMENTS

| | | | | |
|---|---|---|---|---|
| 6,473,608 B1 * | 10/2002 | Lehr et al. | ...................... | 455/402 |
| 7,155,622 B2 * | 12/2006 | Mancey et al. | ............... | 713/324 |
| 7,203,849 B2 * | 4/2007 | Dove | ............................. | 713/300 |
| 7,340,620 B2 * | 3/2008 | Dove | ............................. | 713/300 |
| 7,478,251 B1 * | 1/2009 | Diab et al. | ..................... | 713/300 |
| 7,941,677 B2 * | 5/2011 | Penning | ........................ | 713/300 |
| 2004/0263282 A1 | 12/2004 | Kaku et al. | | |
| 2005/0168326 A1 | 8/2005 | White, II et al. | | |
| 2005/0281326 A1 | 12/2005 | Yu | | |
| 2010/0031066 A1 * | 2/2010 | Geiger et al. | ................. | 713/300 |

FOREIGN PATENT DOCUMENTS

DE   199 38 123 C2   3/2001
WO   2006052358 A2   5/2006

* cited by examiner

*Primary Examiner* — Chun Cao
(74) *Attorney, Agent, or Firm* — The Nath Law Group; Jerald L. Meyer; Stanley N. Protigal

(57) ABSTRACT

Disclosed is a method for managing the power transmitted from a central network component to a decentralized network component via a line, said method determining the ultimately available power in a simple manner. In said method, a respective decentralized network component that is assigned to a predefined power class and can adjust different functionalities, each network component, successively simulates decentralized network components belonging to different power classes, verification is made as to whether the central network component responsible for transmitting power supports a decentralized network component of the simulated type, and the respective decentralized network component decides which functionalities implemented therein are activated after the respective decentralized network component has determined the power classes supported by the central network component.

1 Claim, 2 Drawing Sheets

METHOD FOR MANAGING THE POWER TRANSMITTED FROM A CENTRAL NETWORK COMPONENT TO A DECENTRALIZED NETWORK COMPONENT VIA A LINE

This application was filed under 35 U.S.C. 371 as a national stage of PCT/EP2007/054884, filed 21 May 2007

The present disclosure relates to a method for managing the power transmitted from a central network component to a decentralized network component via a line, and which is capable of setting different functionalities as a function of the energy offered, based on a respective energy consumption.

A method currently exists, the so-called power over Ethernet method (PoE method), by means of which power can be supplied to network capable devices. More specifically, PoE means the IEEE standard 802.3af today. The main advantage of PoE is that a power supply cable can be omitted, and thus Ethernet-connected devices may be installed even in hard to access places, or in area, in which many cables would be interfering. In this manner, installation costs can be drastically reduced on one hand, and the use of a central, interference-free power supply, which is easy to realize, can increase system stability of the device connected on the other hand.

PoE is utilized by network devices consuming little power. The same is typically utilized in IP telephones, smaller hubs, cameras, small servers, or in wireless transmission devices (WLAN access points, FSO devices, Bluetooth access points).

IEEE 802.3af partitions the devices involved into energy suppliers (PSE, power sourcing equipment) and consumers (PD, power devices), which are also known as network terminations, or decentralized network components.

Normally, the free wire pairs in the Ethernet cable are used for energy transmission. However, when this is not possible, for example, because ISDN is lead via the line, the signal carrying wires may also be used. However, this operating mode must be explicitly supported both by PSE and PD, since the voltage must be lead through the Ethernet transceiver in this case.

The challenge for the producers of proprietary PoE solutions used to be the avoiding of damage to non PoE capable terminal devices as much as possible. Although the wires 4, 5, 7, and 8 are usually not allocated according to the Ethernet standard, this does not mean that network cards or similar do not exist, wherein the respective pins are looped through to somewhere. If inadvertently power should be applied via Ethernet at that location, irreparable damage may occur to the device.

IEEE 802.3af solves said problem by means of a method identified as resistive power discovery. In this regard the energy supplier initially provides only minimal power to the wires at regular intervals, by means of which no damage occurs to any device under normal circumstances. The same recognizes, whether and where the energy supplier has a 25 kOhm terminating impedance, and is thus PoE capable. Subsequently the consumer is supplied a low amount of power. Now the consumer must signalize, to which of the power classes (class 0 to class 4) of the multiple classes defined according to the standard it belongs. Not until then the PD receives full power via the PSE, and may assume operation.

The specific power class for a consumer is derived from the maximum received power, and, as mentioned above, may be signalized by the terminal device during the classification phase. Without said signalizing, a terminal device to be supplied with power will be allocated to the most energy saving class, class 0.

The power output of the supplying unit may be managed according to standard in order to avoid that full power must be provided to each terminal device. In the simplest of cases management be such that only terminals of certain classes (i.e. class 1 and class 2) are permissible for all ports. All others are rejected in order not to overload the supplying system.

Rejecting means that no supply voltage is provided for the respective PD.

A more complicated power management could distribute given power reserves to the ports as needed so that, if the resources become low, only terminal devices having certain power classes are permitted.

The terminal devices (PDs) to be supplied may contain a plurality of functions. For example, a VoIP telephone may realize telephony via the IP protocol as the main function, and additionally provide diverse Internet based functions, then assume monitoring tasks, tasks on displays, or carry out the same using synthetic speech, etc.

Power consumption will be respectively high for all functions combined. If such a terminal device makes an attempt to have a power line allocated with a new connection, power management of the supplying unit (PSE) may optionally prevent any type of power supply, although the basic function (possibly especially the "vital" one—cue: "lifeline") could have been carried out without any problems.

Among others, a method for managing energy transmitted from a central network component to a decentralized network component via a line is known from document DE 199 38 123 C2, wherein an energy consumption is determined for the functions associated with the decentralized network component, wherein the energy transmission properties of the line are further measured, and the energy available in the decentralized network component is consequentially determined, and wherein the functions of the decentralized network component are activated as a function of the energy available for the decentralized network component and of the energy consumption of the respective functions of the decentralized network component.

In other words, the energy yield is determined as a function of the DC resistance of the subscriber output. For this purpose respective functionalities are switched on or off, and/or the current state is signaled to a superordinate system.

The object of the present invention is to further improve said method, based on a method of the above mentioned type, such that the energy available in the system may be determined in a simpler manner, and utilized in a more variable manner.

The object is solved by means of a method in which decentralized network components belonging to different power classes are successively simulated by means of a respective decentralized network component. A determination is made whether the central network component responsible for the energy transmission supports a decentralized network component of the simulated type. That the respective decentralized network component decides after determination of the power class supported by the central network component by means of the respective decentralized network component. The functions that are implemented within the same component are activated.

The method comprises that the PD checks the yield of the energy source, and releases additional functionalities only, if the PSE is able to provide a sufficient output. The resistance of the subscriber line no longer plays any role. Furthermore, the classification of the terminal devices into power classes increases the variability of the energy available substantially better, than a subscriber line is able to. Furthermore, the standardized test phase may be utilized, which is substantially more favorable, than an extensive measuring and calculating method.

The PD successively simulates terminal devices of various power classes, and checks the reaction of the PSE thereto.

For this purpose, only two reactions are possible:
a) the PSE release the supply, e.g. the supply voltage is supplied;
b) the PSE does not release the supply, e.g. there is no supply voltage present at the PD.

After the PD has determined, which power classes of the PSE can be supplied, it decides which functionalities can be, or are activated by the same.

A simplified course of detection, classification, and supply in accordance with IEEE 802.3af can be realized as follows:
1. the PSE applies a detection voltage and tests the current;
2. if a terminal device signature is recognized (PD existing), the classification is carried out;
3. the PSE applies a classification voltage;
4. if the power required by the PD can be provided, the supply is switched on;
5. the PSE continuously checks for the presence of the PDs.
6. If the check is negative, the supply voltage is switched off, and the cycle is restarted.

As long as no PC is connected, the detection (step 1) is performed continuously/periodically.

The course of the "simulation" can be performed according to the following procedure:
1. PSE starts the detection;
2. PD signs the detection voltage at an R (resistance) and C (condenser) value in accordance with IEEE 802.3af;
3. PSE starts classification;
4. PD requires a power class by means of simulating an R and C load in accordance with IEEE 802.3af.

If the PSE is unable to deliver the output:
5. PSE does not release any supply;
6. PSE restarts the next detection cycle; the PD then requests the next power class.

If the PSE is able to deliver the output, and the PD wants to test another class:
5. PSE switches the supply on;
6. PD has a high resistance;
7. PSE switches the supply off, and restarts the detection cycle.

If the PSE is able to deliver the output, and the PD is satisfied:
5. PSE switches the supply on;
6. PD draws power.

The PD can test the power classes in any desired sequence. The times for the individual steps are derived from the switching on, measuring, and switching off time, as specified in the IEEE 802.3af.

The above mentioned measures can support a power management. The terminal device automatically adjusts. It only occupies as many resources as an allocation is possible.

An embodiment of the invention is explained in further detail below, based on a drawing. It shows:

DETAILED DESCRIPTION

CPE (customer premises equipment) denotes a subscriber terminal device in a computer network, a telephone network, or in a telephone system. Such terminal devices usually belong to the end user or customer, and are connected to a telephone or data network (Internet or LAN). Telephone, fax devices, and modems are the most common CPE devices. CPE is therefore synonymous for PD.

Figure 1:
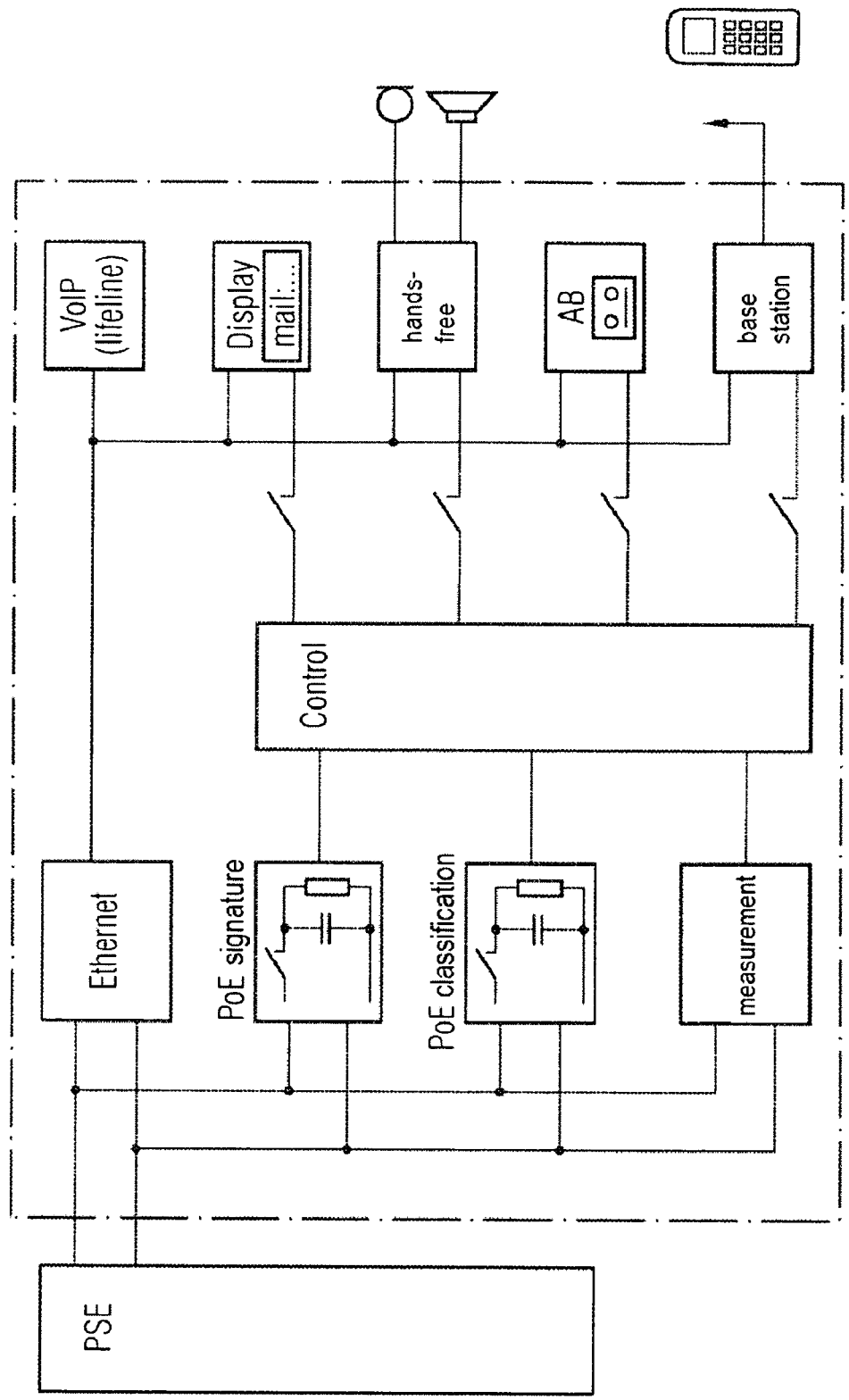
FIG. 1 a block diagram of a VoIP telephone as an example for a CPE, or PD, respectively, according to the invention, and FIG. 2 a circuit variation of an input part of a CPE, or PD, respectively, according to FIG. 1.

FIG. 1 illustrates a principle drawing of a VoIP telephone (voice-over internet protocol) having integrated additional functions. In the normal case the VoIP telephone is supplied with power from the low voltage network. If the low voltage network fails, the telephone may maintain part of the functions, depending on the supply line of the PSE.

In case of lost supply power from the low voltage network for the VoIP telephone, the VoIP telephone carries out the method described above, and therefore checks, which maximum power class of the PSE unit that is still available, which also supplies power, is still supported. For this purpose the telephone impresses, for example, the classification currents of the highest power class (i.e. class 3) only during the classification phase. If the PSE subsequently releases the supply, e.g. applies a supply voltage, the test phase can be completed, and all available functions can be activated. If no supply occurs through the PSE, the telephone tests the next lower power class (class 2). If the same is confirmed by the PSE by means of applying the supply voltage, the display and a voice message serve can be still activated in addition to actually placing a phone call via the Internet protocol. The handsfree set and the operation of a mobile telephone can no longer be supported. If this tests also fails, and only the lowest power class (class 1) can be operated by the PSE, only placing a phone call can be enabled. In this manner, at least an emergency call (lifeline service) can be made during the supply.

Other implementation examples are the following: wireless access points without dedicated power supply (i.e. transmission power may be varied), and sensors in the automation technology, which are supplied via PoE.

Figure 2:
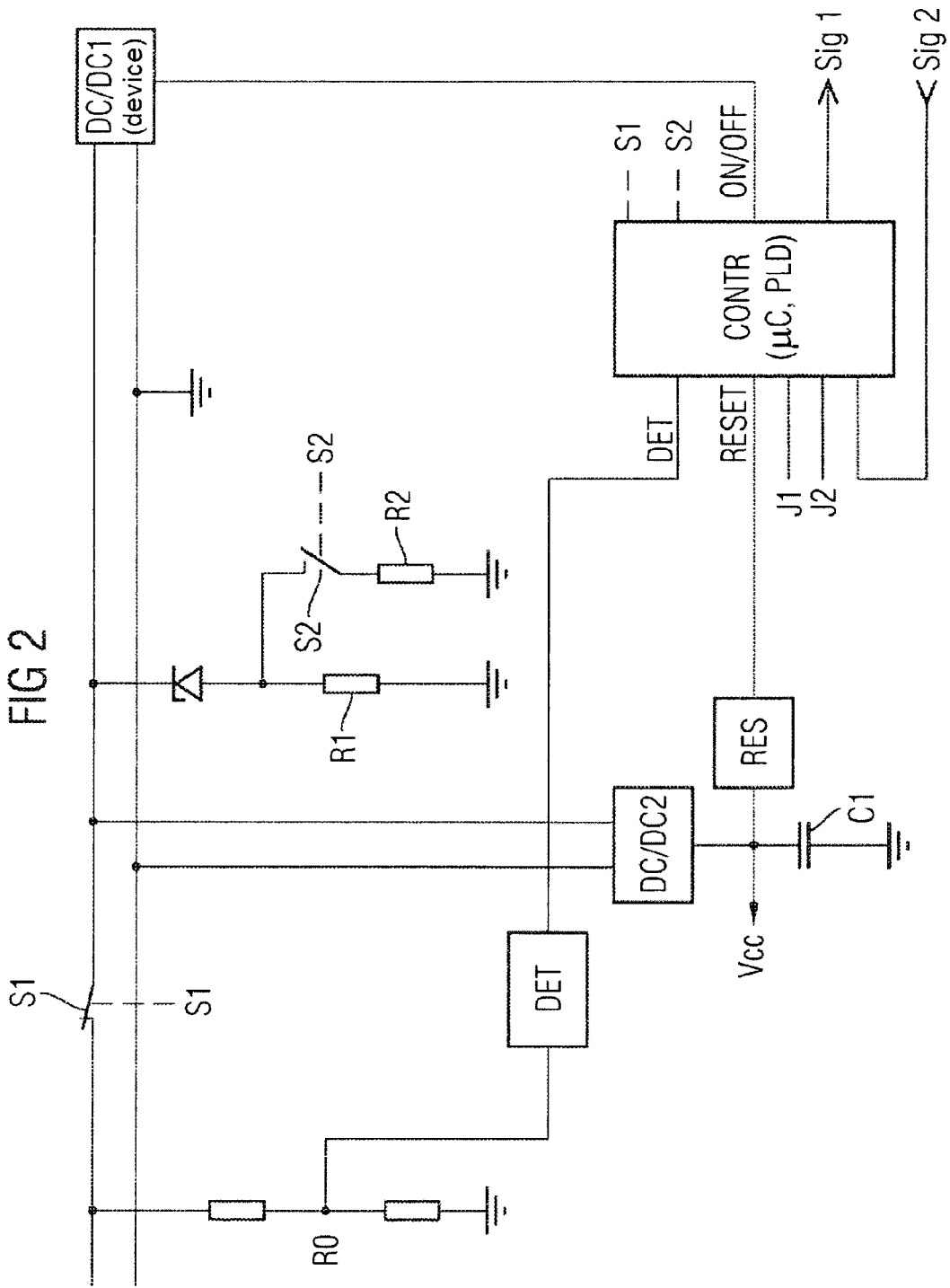

FIG. 2 illustrates a more detailed circuit variation for a respective CPE, or PD input part.

The CPE device shown in FIG. 2 is an IP telephone having two possible power consumptions. The IP telephone supports a number of functions at full power supply (class 3). At a limited power supply (class 2) the shown IP telephone still supports lifeline service.

The shaded circuit parts in FIG. 2 are additionally required for automatic recognition. The coupling to RJ45 and the Graetz bridge are omitted.

The individual circuit parts/signals shown in FIG. 2 have the following meanings:

| | |
|---|---|
| R0 | voltage divider, realized minimum power for detection; |
| R1 | classification power for class 2; |
| R2 | classification power for class 3; |
| D1 | Z diode corresponding to the test voltage; |
| S1 | "opener" (i.e. depletion FET), separates the CPE from the supply; |
| S2 | "closer" (i.e. enh. FET), switches R2 on; |
| C1 | energy storage (i.e. condenser); |
| CONTR | low-cost controller/PLD, contains the state machine; |
| DC/DC1 | power supply for the CPE, can be switched; |
| ON/OFF | switches DC/DC1; |
| DC/DC2 | power supply for the control unit; |
| DET | voltage recognition; |
| RES | reset controller; |
| Sig1 | signalizes to the CPE processor, which power class is available; |
| Sig2 | the CPE processor forces default state; |
| J1, J2 | optional jumpers; |
| VCC | power supply. |

In the currentless state (default) the circuit is rated such that the device registers as class 2. The course is completely normal until the PSE switches the supply on. However, DC/DC1 is still held in the "off" position. The energy storage is now loaded via DC/DC2. RES ensures a defined startup, e.g. CONTR "knows" that an emulation is being restarted.

After C1 has loaded, CONTR switches S1 off. The PSE recognizes the separation, and begins a new detection/classification procedure after a while. DET recognizes and signalizes the same to CONTR. S2 is switched on this time so that the CPE impresses a test current in accordance with class 3. If the PSE switches the supply on (class 3 can be supplied), CONTR will release the power supply DC/DC1. If not (power is offered for class 2 only), S2 is opened, and CONTR will be satisfied with class 2 at the next startup.

The energy storage must be rated such that a "classification cycle" can be bridged. Said "cycle" is the time, during which the PSE begins a new classification procedure, after S1 has been opened.

The rating of the energy storage there depends on the length of the cycle, and on the power consumption of the control block. Using a power-saving mini controller and a medium sized condenser, 1 minute should not present a problem.

A permanent supply, for example, by means of an accumulator, for storing diverse states, is not provided. If an application requires the same, an EEPROM/FLASH could hold the data.

If C1 is discharged after a while, RES ensures a defined startup. In any case, DET recognizes a failure of the supply voltage such that CONTR may also assume the default state on its own.

The special case, wherein CPE is in the status of "class 2," and the PSE can provide more supply power, may occur, if the PSE utilizes a power management system. It is the responsibility of the CPE processor to start a new cycle, if necessary. CONTR is prompted via Sig2 to restart. In the IP telephone this may be initiated, for example, after a call has been terminated.

In another special case the PSE has a power management that is not compliant with the automatics. In this regard it should be mentioned that the standard does not define all situations at 100%. A certain behavior (i.e. class 2 only) of CONTR may be forced via the jumpers (JU1, J2).

In another special case the PSE only supports class 0. In this case the classification procedure may be omitted in accordance with IEEE 802.3af. In any case, DET recognizes the supply, and each other power class is a subset of class 0.

The invention claimed is:

1. A method for managing power transmitted from a central network component to a decentralized network component via a line, being capable of setting different functionalities as a function of energy offered, each being based on a respective energy consumption, and which are further responsible for allocating the decentralized network component into a corresponding power class, characterized in that decentralized network components belonging to different power classes are successively simulated by means of a respective decentralized network component, and it is checked, whether the central network component responsible for energy transmission supports a decentralized network component of the simulated power class, and that the respective decentralized network component decides after determination of the power class supported by the central network component by means of the respective decentralized network component, which functionalities implemented within said decentralized network component are activated.

* * * * *